United States Patent
Gleine

(10) Patent No.: US 8,794,018 B2
(45) Date of Patent: Aug. 5, 2014

(54) SYSTEM AND METHOD FOR THE MEASUREMENT AND PREVENTION OF ICING IN A CONDUIT

(75) Inventor: Wolfgang Gleine, Kakenstorf (DE)

(73) Assignee: Airbus Operations GmbH (DE)

( * ) Notice: Subject to any disclaimer, the term of this patent is extended or adjusted under 35 U.S.C. 154(b) by 1073 days.

(21) Appl. No.: 12/810,929

(22) PCT Filed: Dec. 23, 2008

(86) PCT No.: PCT/EP2008/068251
§ 371 (c)(1),
(2), (4) Date: Oct. 1, 2010

(87) PCT Pub. No.: WO2009/083558
PCT Pub. Date: Jul. 9, 2009

(65) Prior Publication Data
US 2011/0005247 A1   Jan. 13, 2011

(30) Foreign Application Priority Data
Jan. 23, 2008 (DE) .......................... 10 2008 005 700

(51) Int. Cl.
*F25D 21/02* (2006.01)

(52) U.S. Cl.
USPC .................. 62/150; 62/125; 62/126; 62/128; 62/139; 62/140; 73/24.04; 73/170.26; 73/570; 73/584; 340/582

(58) Field of Classification Search
USPC ........... 62/125–129, 139–140, 150; 73/24.04, 73/170.26; 340/582
See application file for complete search history.

(56) References Cited

U.S. PATENT DOCUMENTS

| | | | |
|---|---|---|---|
| 4,209,993 A * | 7/1980 | Rannenberg | 62/80 |
| 4,461,178 A | 7/1984 | Chamuel | |
| 4,553,137 A * | 11/1985 | Marxer et al. | 340/582 |
| 4,775,118 A | 10/1988 | Daniels | |
| 5,195,046 A | 3/1993 | Gerardi et al. | |
| 5,206,806 A | 4/1993 | Gerardi et al. | |
| 6,286,370 B1 | 9/2001 | Sinha | |
| 7,000,871 B2 * | 2/2006 | Barre et al. | 244/134 F |
| 2002/0088281 A1 | 7/2002 | Gorman et al. | |

FOREIGN PATENT DOCUMENTS

| | | |
|---|---|---|
| DE | 4340871 C1 | 4/1995 |
| DE | 202006020207 U1 | 12/2007 |
| WO | 0064737 A1 | 11/2000 |

* cited by examiner

*Primary Examiner* — Cheryl J Tyler
*Assistant Examiner* — Jonathan Bradford
(74) *Attorney, Agent, or Firm* — Lerner, David, Littenburg, Krumholz & Mentlik, LLP

(57) ABSTRACT

A system for preventing icing in a conduit, as can occur in an aircraft's air conditioning system, includes at least one sensor for acquiring mechanical oscillations of the conduits, an electronic evaluation unit and an electronic control unit. The sensor is connected to the electronic evaluation unit, which knows characteristics relating to the oscillation behavior of the conduit and is equipped to compare the measured conduit oscillations with these characteristics, and through correlation to interpret them as conduit icing, and in the case of conduit icing to emit a signal to the control unit. If the operation-associated oscillations are inadequate, oscillations can be generated or amplified through an actuator. With this system an icing state within the conduit can be detected without the use of sensors located in the interior cross section of the conduit, which itself serves as a sensitive element.

12 Claims, 5 Drawing Sheets

SYSTEM AND METHOD FOR THE MEASUREMENT AND PREVENTION OF ICING IN A CONDUIT

CROSS REFERENCE TO RELATED APPLICATIONS

The present application is a national phase entry under 35 U.S.C. §371 of International Application No. PCT/EP2008/068251, filed Dec. 23, 2008, published in German, which claims the benefit of U.S. patent application No. 61/009,520, filed Dec. 28, 2007, and of the German patent application 10 2008 005 700.2, filed Jan. 23 2008, the disclosures of which applications are hereby incorporated herein by reference.

TECHNICAL FIELD OF THE INVENTION

The invention relates to a system for the prevention of icing in a conduit.

BACKGROUND TO THE INVENTION

In air conduits of aircraft air-conditioning systems, in particular in the region of a discharge duct between the air conditioning pack and the mixing chamber, various forms of ice growth on the interior wall of the conduit occur under certain operating conditions. Without countermeasures this can result in complete closing of the duct cross section within a short time, which leads to undesirable performance characteristics of the air conditioning system. The critical operating conditions occur in particular during operation on the ground when the exterior air is warm and humid, when the air conditioning system needs to cool down a heated aircraft cabin from a high to a low temperature.

Nowadays, undesirable ice growth in ventilation ducts is usually prevented by periodically undertaken feed-in of hot air from the engine, so-called bleed air. Since there are uncertainties concerning ice formation, this also results in unnecessary heating of the discharge ducts, with such heating considerably reducing the efficiency of the air conditioning system and causing unnecessary energy loss.

In order to solve this problem, several concepts for detecting ice growth within conduits have so far been used on an experimental basis, however without achieving much success concerning reliable early detection or accurate ice thickness measurement. These concepts comprise, in particular, systems based on ultrasound sensor technology, in which systems it is, however, not possible to unequivocally determine the existing ice layers from the received signal echoes. It is impossible to differentiate between dense ice, loose ice snow and reflections from the opposite wall of the conduit. Temperature sensors that are used within the conduit cross section also do not provide an optimum solution because the temperature sensors themselves can ice up or can become damaged as a result of being bombarded by fast-flying ice particles. In addition, the flow within the conduit cross section is disturbed by the temperature sensors arranged therein so that the flow resistance to be overcome by the flowing air increases. Differential pressure measurement provides a further option for determining the thickness of ice layers in conduits, however in differential pressure measurement pressure measurement holes that lead outwards through the conduit wall close up as a result of ice formation, or pressure sensors installed within the conduit ice up. Accordingly, in principle all the measuring techniques based on the measuring of parameters within the conduit cross section are associated with the disadvantages of possible destruction of the sensors that are being used, or of their obstruction as a result of icing up or of bombardment by ice particles.

SUMMARY OF THE INVENTION

It may therefore be the object of the invention to reduce or eliminate the above-mentioned disadvantages. In particular, it may be the object of the invention to propose a system by means of which accurate reliable monitoring of conduit cross sections in relation to icing is possible, or an efficient system for preventing icing in a conduit, in which simultaneous reliable monitoring of the conduit cross section for any ice build-up takes place.

According to an embodiment of the invention, this object may be met by a system for measurement and prevention of icing in a conduit, which system comprises at least one sensor for acquiring mechanical oscillations of the conduit, an electronic evaluation unit and an electronic control unit, wherein the at least one sensor is connected to the electronic evaluation unit, and the evaluation unit comprises characteristics relating to the oscillation behaviour of the conduit and is equipped to compare the measured conduit oscillations with the characteristics and by means of correlation to interpret them as conduit icing, and in the case of conduit icing to emit a signal to the control unit.

This solution is associated with a special advantage in that there is no need to integrate any sensors within the conduit; instead only the global and local oscillations of the conduit are determined. It is a prerequisite of the use of this method for the conduit to oscillate during operation of the air conditioning system. In this way the conduit, which is to be monitored, of the air conditioning system is itself used as a sensitive element. For example, suitable sensors can be arranged from the outside on the conduit so that accelerations and/or local expansion of the conduit can be measured. Apart from many others, suitable sensors for this are, for example, electrodynamic acceleration sensors, piezoresistive strain gauges and piezoelectric elements. Depending on the mass distribution of the conduit, its local oscillation behaviour changes so that by means of a comparison with the characteristics associated with the conduit it becomes possible to determine any local increase in mass in the conduit, which increase in mass would indicate icing within the conduit cross section at the monitored position. The determined oscillations of the conduit are evaluated in a central data evaluation unit, in particular by means of a modal analysis method, and are compared with previously determined characteristics of the conduit. If the conduit is not already made to oscillate as a result of operation of the air conditioning system, or if the occurring oscillations are insufficient for accurately measuring the ice build-up, oscillations can be caused or amplified by means of one or several suitable electrodynamic, piezoelectric or other external oscillation generators. Particularly advantageous is the use of sensors based on the piezoelectric effect in order to determine conduit oscillations, which sensors can in an alternating manner also be used to trigger oscillations in that an alternating voltage is applied to them. The actuator or actuators is/are to be affixed at suitable positions, which have been calculated, simulated or measured beforehand, at the conduit, at which positions particularly good oscillation excitation can take place.

At the onset of ice growth at any position in the conduit, the local and global oscillation behaviour of the conduit may change in a characteristic manner, which oscillation behaviour may be acquired by the sensors that have been applied from the outside. The acquired oscillations are analysed by the central data evaluation unit, wherein analysing comprises a comparison with data of an ice-free conduit and/or with experimentally determined characteristic cases of specific icing. By correlating the characteristics with the determined oscillation forms it becomes possible to determine the icing state, and, if required, for example if a specified ice layer is exceeded, to extract control magnitudes for de-icing measures so that de-icing measures can be triggered that are to act until ice-free oscillation behaviour is restored.

Advantageous embodiments are stated in the subordinate claims. Furthermore, the object is met by a method for preventing icing in a conduit.

BRIEF DESCRIPTION OF THE FIGURES

Below, the invention is explained with reference to the figures. In the figures identical objects are designated by means of the same reference characters. The following are shown.

DETAILED DESCRIPTION OF THE FIGURES

Figure 1:
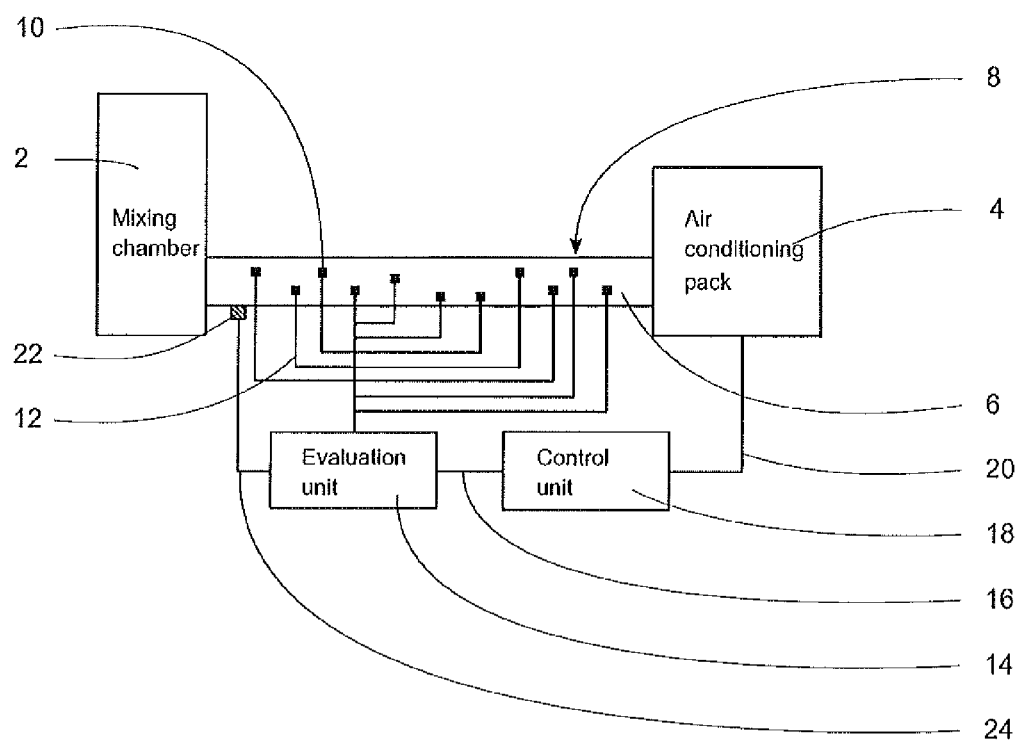
FIG. 1: a diagrammatic overview of a system according to the invention with autonomous control of the de-icing measure.

FIG. 1 shows part of an aircraft's air conditioning system comprising a mixing chamber 2, an air conditioning unit 4 (hereinafter also referred to as an "air conditioning pack") and a conduit 6 arranged between them, for example in the form of a discharge duct. In the mixing chamber 2 air that emanates from the cabin of the aircraft is mixed with conditioned fresh air that emanates from the air conditioning pack 4, and is subsequently fed to the cabin by means of a conduit system. In particular in cases where very considerable cooling performance for cooling the cabin is requested, the air conveyed in the conduit 6 becomes relatively cold, and consequently icing effects can occur within the conduit 6 as a result of condensed and frozen water vapour. In this process ice builds up in a layer on the interior wall of the conduit 6, thus resulting in narrowing of the conduit cross section 6. As a result of the increased flow resistance due to the narrower cross section in the worst case it is hardly possible to still convey air through the conduit 6 so that the efficiency of the air conditioning system is reduced.

On the outside 8 of the conduit 6 there are a multitude of sensors 10, spaced apart from each other and essentially arranged along the entire length of the conduit 6, which sensors 10 are used to acquire the oscillation behaviour of the conduit 6. In this arrangement the sensors 10 can, for example, be implemented as acceleration transducers, strain gauges or piezo elements. Any type of sensor 10 that by means of any mechanism of action can acquire local oscillations is used for the system according to the invention. Particularly advantageous sensors include piezoresistive strain gauges, piezoelectric strain sensors and piezoelectric elements. The arrangement of the sensors is not limited to the arrangement shown in the figures. For example, a greater number or a lesser number of sensors 10 can be affixed to a conduit 6; however, preferably those regions are selected in which a particularly high oscillation amplitude is expected.

The sensors 10 are connected to the evaluation unit 14 by way of lines 12, with the evaluation unit 14 being able to analyse the data of the sensors 10 and to compare said data with the characteristics of an ice-free and/or an iced conduit of a defined layer thickness. The measuring signals that emanate from the sensors 10 are, for example, made accessible for calculation by means of modal analysis. If the evaluation unit 14, as a result of the correlation of the encountered oscillations with the characteristics, determines that an icing state is present, preferably a corresponding signal is emitted. The evaluation unit 14 can be connected, for example, to a control unit 18 by way of a connection 16, and can transmit a signal that results in de-icing by means of a corresponding increase in the temperature of the air provided by the air conditioning pack 4. Consequently, in the proposed first embodiment the control unit 18 is connected to the air conditioning pack 4 by means of a connection 20 and can correspondingly influence the cooling process.

If in the process of de-icing, by measuring the icing state of the conduit 6, it is detected that the monitored conduit 6 is free of any ice, the signal emitted by the control unit 18 can be cancelled so that the air conditioning pack 4 again assumes the previous air temperature.

Acquisition of the local and global oscillation behaviour of the conduit 6 can only take place during oscillation of the conduit 6. If no oscillation is present as a result of air flowing through the conduit 6, such oscillation can be triggered by means of an actuator 22. The actuator 22 can be of any design that is capable of triggering oscillation. Advantageously the sensors 10 are designed as piezoelectric sensors which during the measuring procedure supply an alternating voltage that, for example, corresponds to the local oscillation frequency. Likewise, oscillation can be triggered by applying a suitable alternating voltage to the piezoelectric sensors 10. Preferably, the actuator 22 is connected to the evaluation unit 14 by way of a connection 24 that is used to trigger the oscillation and that supplies, for example, an alternating voltage.

Figure 2:
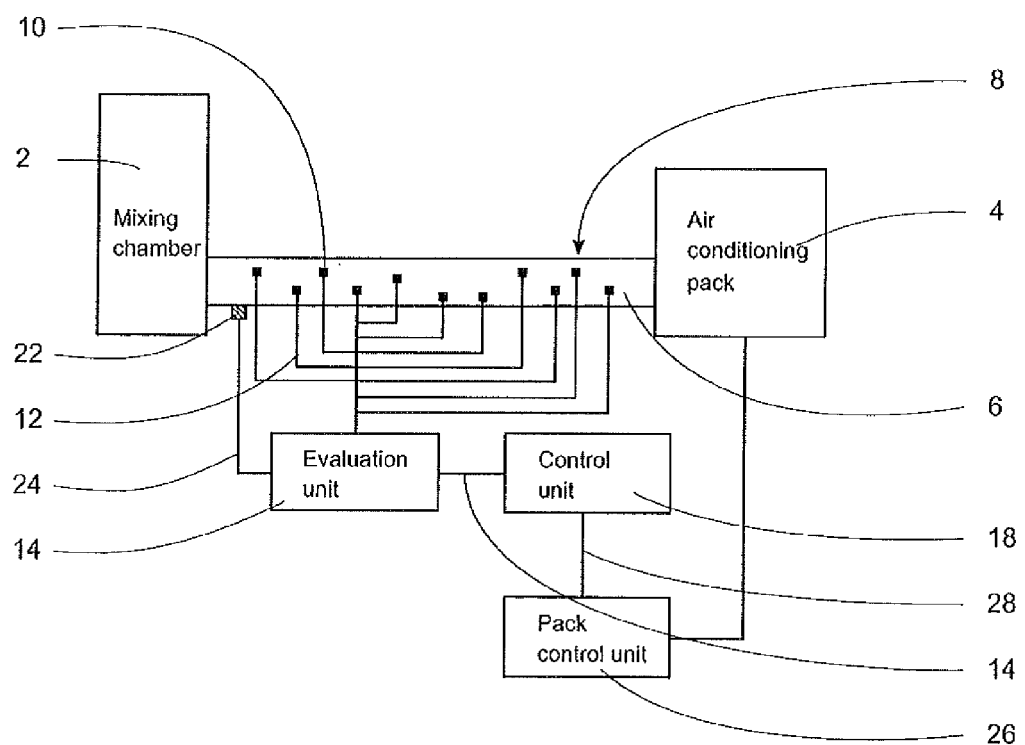
FIG. 2: a diagrammatic view of the system according to the invention with system-integrated control of the de-icing measure.

In FIG. 2 a further embodiment of the system according to the invention is proposed. The embodiment of this system differs from that shown in FIG. 1 in that the control unit 18 is connected to a pack control unit 26 by way of a connection 28.

For the purpose of obtaining the characteristics of the conduits 6 of both embodiments, for example a spatially-resolving thermography method is proposed. In this arrangement it is possible, by means of short-duration high-energy light pulses to supply energy evenly from the outside to the conduit 6 to be checked, which energy is absorbed on the outer conduit surface 8. Depending on the local thermal capacity, for example on the one hand the conduit wall without ice when compared on the other hand to the conduit wall with ice, different temperature increases along the conduit surface 8 are achieved, and consequently any commencement of ice growth can be made locally visible by means of a correspondingly sensitive thermography camera. In known icing situations the conduit 6 is then made to oscillate, which oscillation is acquired by the sensors 10. The oscillation parameters obtained in this manner can be correspondingly processed depending on the detected icing state, and can be stored in the evaluation unit 14 so that at a later stage said oscillation parameters can be correlated to oscillation data obtained in operation.

Figure 3:
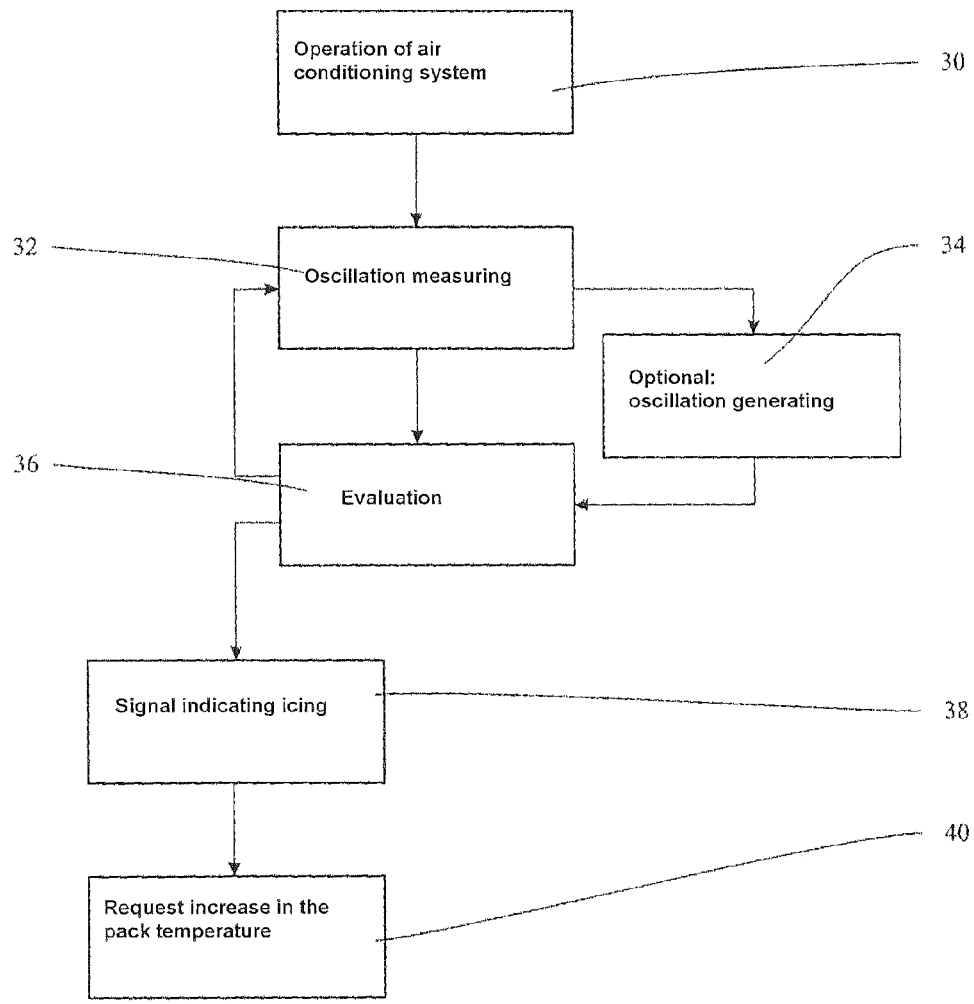
FIG. 3: a schematic process illustration of the method according to the invention.

FIG. 3 finally shows the essential steps of the method, according to the invention, for the prevention of icing in a conduit. As soon as the aircraft's air conditioning system 30 starts up, oscillation measuring 32 commences. In this arrangement, oscillation measuring 32 can take place continuously or at predetermined intervals. If the conduit 6 to be monitored does not oscillate to an adequate extent, optionally an oscillation generating device 34 can be operated. Such oscillation generating 34 can also take place either continuously or at predetermined intervals, depending on when oscillation measuring is carried out. Evaluation 36 of the sensor data within the evaluation unit 14 takes place continuously or on a one-off basis during the measuring process. During the evaluation process the evaluation unit 14 compares the measured oscillation parameters, in other words at least the amplitude and the frequency, and compares them with the characteristics associated with the conduit 6. If this comparison shows a deviation from the oscillation data of a conduit that is free of ice, when a permissible icing situation has been exceeded an icing signal 38 can be emitted, for example by way of a threshold value algorithm, from the evaluation unit 14. This icing signal can be conveyed to a control unit 18 which carries out further measures for de-icing. In a further step, this control unit 18 could inform 40 a pack control unit 26 that there is an iced conduit 6, or it could request a temperature increase.

Figure 4A:
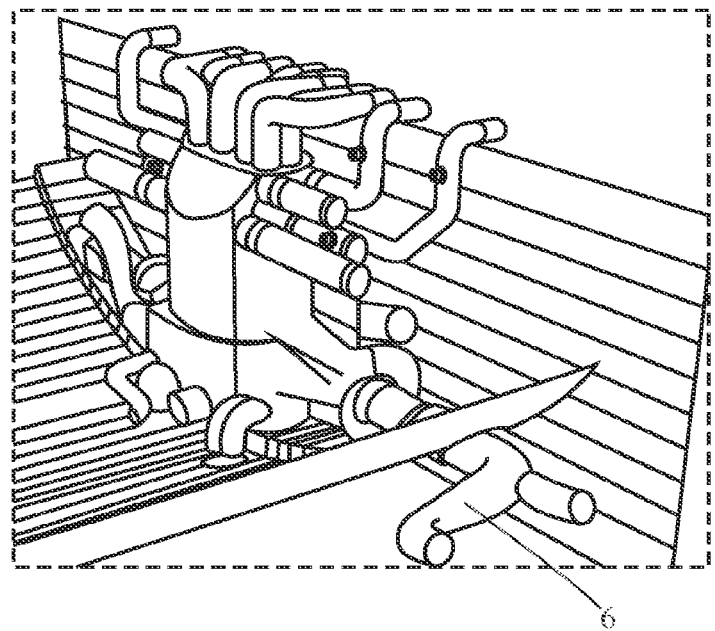
FIGS. 4*a*-4*d*: a three-dimensional view of the conduit to be monitored, with the example of a air conditioning system of a wide-body aircraft.
Figure 4B:
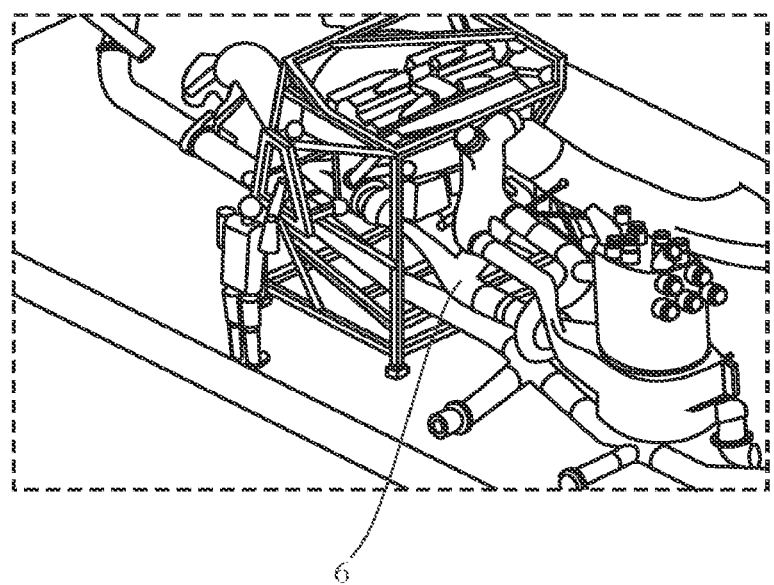
Figure 4C:
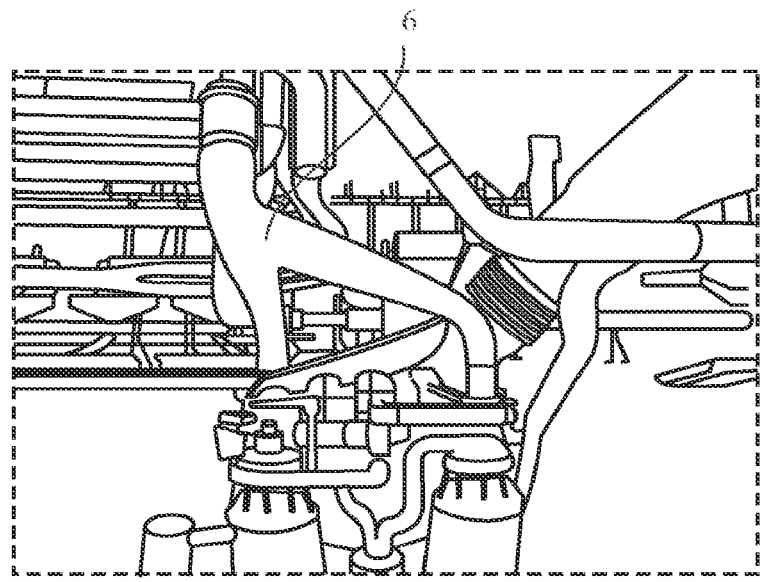
Figure 4D:
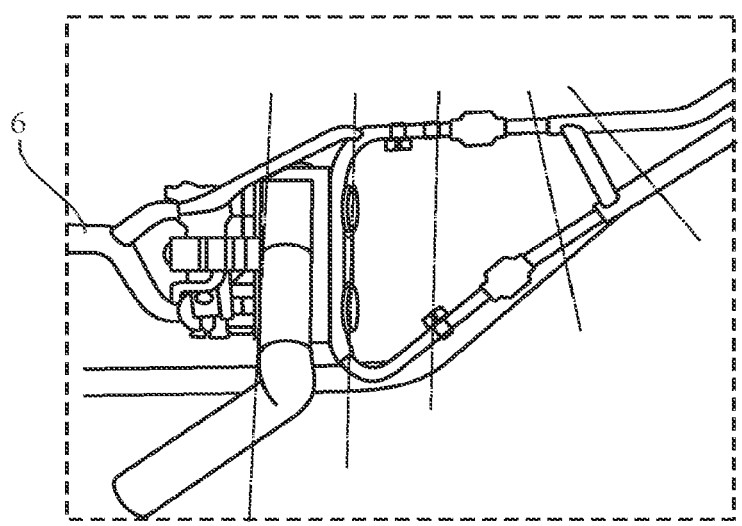

Finally, FIGS. 4a-4d show examples of the conduit 6 that is to be monitored, by means of four three-dimensional views selected in the form of sections of the installation space of an air conditioning system of a wide-body aircraft. FIGS. 4a and 4b clearly show the mixing chamber of the air conditioning system, which among other things is connected to an air conditioning unit by means of the conduit 6 to be monitored.

The design of the system according to the invention is not limited to the use in aircraft in relation to conduits of the air conditioning system. Instead, the system according to the invention can be used in all types of air conduits which, in particular, are integrated in all types of vehicles and buildings.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A system for the measurement and prevention of icing in a conduit, comprising a plurality of sensors for acquiring mechanical oscillations of the conduit, an electronic evaluation unit and an electronic control unit,
   wherein the sensors are connected to the electronic evaluation unit, the evaluation unit comprises characteristics relating to the oscillation behaviour of the conduit and is equipped to compare the measured conduit oscillations with the characteristics, and by means of correlation to interpret them as conduit icing, and in the case of conduit icing to emit a signal to the control unit,
   wherein the evaluation unit is equipped, from sensor data and correlation with known characteristics that are associated with the conduit, to determine local and global increases in the mass of the conduit and thus of an ice layer, and, if a specified local or global thickness of the ice layer is exceeded, to emit a signal to the control unit for triggering a de-icing procedure.

2. The system of claim 1, wherein the sensors are acceleration sensors.

3. The system of claim 1, wherein the sensors are piezoresistive strain gauges.

4. The system of claim 1, wherein the sensors are piezoelectric elements.

5. The system of claim 1, comprising at least one actuator, arranged on the conduit, for generating oscillation.

6. The system of claim 5, wherein the actuator is a piezoelectric element and is configured at the same time to be used as a sensor.

7. The system of claim 1, wherein the actuator is an electrodynamic actuator.

8. The system of claim 1, wherein the sensors are arranged on the outer conduit surface.

9. The system of claim 1, wherein, for the purpose of de-icing, the temperature of air flowing through the conduit is increased.

10. A method for the measurement and prevention of icing in a conduit, comprising:
    measuring oscillation by a plurality of sensors for measuring mechanical oscillations of the conduit, selectively generating oscillation for measuring the ice build-up if the conduit is not made to sufficiently oscillate as a result of operation of the air conditioning system,
    determining of local and global increases of weight by correlating the sensor data with known characteristics associated with the conduit and, if a predetermined local or global thickness of an ice layer has been exceeded,
    emitting a signal to trigger a de-icing process.

11. The method of claim 10, wherein, for the purpose of de-icing, the temperature of the air flowing through the conduit is increased.

12. An aircraft comprising an air conditioning system, including a system for the measurement and prevention of icing in a conduit, the system comprising:
    a plurality of sensors for acquiring mechanical oscillations of the conduit, an electronic evaluation unit and an electronic control unit,
    wherein the sensors are connected to the electronic evaluation unit, the evaluation unit comprises characteristics relating to the oscillation behaviour of the conduit and is equipped to compare the measured conduit oscillations with the characteristics, and by means of correlation to interpret them as conduit icing, and in the case of conduit icing to emit a signal to the control unit,
    wherein the evaluation unit is equipped, from sensor data and correlation with known characteristics that are associated with the conduit, to determine local and global increases in the mass of the conduit and thus of an ice layer, and, if a specified local or global thickness of the ice layer is exceeded, to emit a signal to the control unit for triggering a de-icing procedure.

* * * * *